(No Model.)
A. BRUNER.
ELECTRIC CONDUIT.
No. 474,468. Patented May 10, 1892.
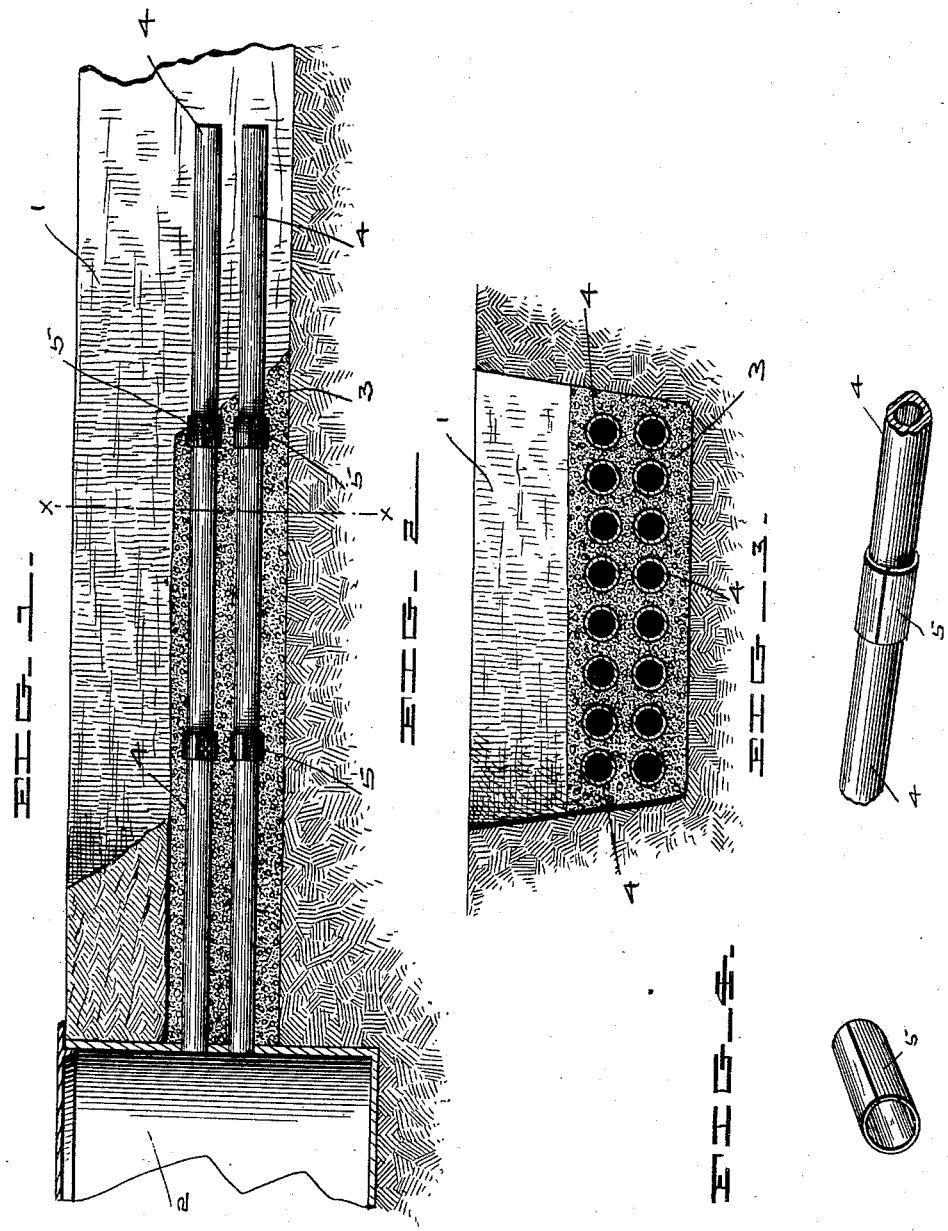
Witnesses
H. D. Nealy
E. B. Griffith
Inventor
Augustus Bruner
By his Attorney
C. A. Jacobs
THE NORRIS PETERS CO., PHOTO-LITHO., WASHINGTON, D. C.

UNITED STATES PATENT OFFICE.

AUGUSTUS BRUNER, OF INDIANAPOLIS, INDIANA.

ELECTRIC CONDUIT.

SPECIFICATION forming part of Letters Patent No. 474,468, dated May 10, 1892.

Application filed March 7, 1892. Serial No. 423,972. (No model.)

*To all whom it may concern:*

Be it known that I, AUGUSTUS BRUNER, of Indianapolis, county of Marion, and State of Indiana, have invented certain new and useful Improvements in Conduits; and I do hereby declare that the following is a full, clear, and exact description thereof, reference being had to the accompanying drawings, in which like letters refer to like parts.

My invention relates to a new and useful improvement in the construction of conduits, and to one that is especially adapted for wires and cables, the main object being to provide a cheap, secure, and water-tight conduit consisting of a series of pipes suitably connected together and laid in a bed of water-proof material covering the same, and its construction is such as to facilitate the laying and economize cost, while at the same time the strength of the whole is in no wise diminished.

In the drawings, Figure 1 represents a sectional view through an open trench in which my method of laying pipe has been employed, several sections being completed and the next one begun. Fig. 2 is a cross-section on the line $x\ x$, Fig. 1. Fig. 3 is a detail perspective view showing the manner of connecting two sections of pipe together. Fig. 4 is a detached view of the connecting-band.

In detail, 1 represents an open trench leading from an excavation or manhole 2 of any suitable size and depth, and in the bottom of the trench 1 is placed a mass of cement about three or four inches in thickness, as indicated at 3. Pipes 4, formed of fire-clay, terra-cotta, or other earthenware, made in sections of such length as to be easily handled and of any desired diameter, are set in place in the layer of concrete, the ends of the sections abutting against each other, the joints being covered or closed with a flexible band 5, as shown in Fig. 3, which is preferably formed of sheet metal, and the main object of its use is to prevent the cement from leaking through the joints, and when the cement hardens around the pipes a water-tight covering is formed. Another layer of cement is put in on top of the first layer of pipes, and a second layer of pipes may then be laid in the cement, and so on until as many pipes as desired have been laid in place, when the top is covered over with a last layer of cement and the trench is filled in with earth to the level of the ground surface.

After the cement has hardened it forms a water-proof wall around all the pipes, the inside of them being perfectly smooth, the cement at the same time protecting them from any change of temperature or injury by moisture.

The connecting-band shown in the drawing is one that is quickly put in place, allowing the conduits to be laid in a very short time, the band being, as it is, merely a metal one, which is slit on one side, so that it may be opened and slipped around the pipes, springing quickly back into place and operating to completely close the joint formed by the abutting pipes.

What I claim as my invention, and desire to secure by Letters Patent, is the following:

1. An underground conduit for wires or cables, composed of one or more series of clay pipes, their ends abutting and forming a joint, such joints closed by a flexible metallic band slit on one side and adapted to be sprung around the joint, such pipes surrounded by cement, all combined substantially as shown and described.

2. In a conduit for electrical conductors, the combination of a series of clay pipes, their ends abutting, forming joints, such joints closed by a flexible metallic band slit on one side and adapted to be sprung around the joint and retained thereon by its spring, such pipes and joints surrounded by a filling of water-proof material, substantially as shown and described.

In witness whereof I have hereunto set my hand this 4th day of March, 1892.

AUGUSTUS BRUNER.

Witnesses:
 H. D. NEALY,
 C. B. GRIFFITH.